United States Patent

Hayashi et al.

[11] Patent Number: 6,004,238
[45] Date of Patent: Dec. 21, 1999

[54] POWER TRANSMISSION BELT

[75] Inventors: Takehiro Hayashi; Yoshiyuki Kitano; Takayuki Kusano, all of Kobe, Japan

[73] Assignee: Bando Chemical Industries, Ltd., Kobe, Japan

[21] Appl. No.: 09/002,032

[22] Filed: Dec. 31, 1997

[51] Int. Cl.[6] .............................. F16G 1/00; F16G 1/04
[52] U.S. Cl. ............................. 474/263; 474/268
[58] Field of Search .................... 474/261, 263, 474/265, 268, 166, 167

[56] References Cited

U.S. PATENT DOCUMENTS

| | | | |
|---|---|---|---|
| 3,862,553 | 1/1975 | Schwemmer et al. | 68/15 |
| 4,534,750 | 8/1985 | Okumoto | 474/261 |
| 4,778,696 | 10/1988 | King | 427/235 |
| 5,498,212 | 3/1996 | Kumazaki | 474/263 |
| 5,501,908 | 3/1996 | Shioyama et al. | 428/395 |
| 5,791,109 | 8/1998 | Lehnert et al. | 52/309.17 |
| 5,851,635 | 12/1998 | Di Giacomo et al. | 428/167 |
| 5,891,561 | 4/1999 | Kinoshita et al. | 428/295.1 |

FOREIGN PATENT DOCUMENTS

| | | |
|---|---|---|
| 0 722 053 | 7/1996 | European Pat. Off. . |
| 59-65644 | 4/1984 | Japan . |
| 62-113940 | 5/1987 | Japan . |

*Primary Examiner*—Tamara L. Graysay
*Assistant Examiner*—Matthew A. Kaness
*Attorney, Agent, or Firm*—Sixbey Friedman Leedom & Ferguson; Thomas W. Cole

[57] ABSTRACT

In a V-ribbed belt including short fibers such as carbon fibers in the surfaces of ribs, that is, a contact surface with a pulley, the surfaces of the ribs are coated with a water repellent agent so that the surfaces of the ribs can attain water repellency. Thus, while suppressing performance degradation and increase in manufacturing cost of the belt, the water removing property against water splashed on the belt is improved, so as to prevent slip and an accompanied unpleasant noise from being caused.

1 Claim, 1 Drawing Sheet

POWER TRANSMISSION BELT

BACKGROUND OF THE INVENTION

The present invention relates to a power transmission belt or roller, and more particularly, it relates to a power transmission belt or roller including short fibers in a surface in contact with an opposite member such as a pulley.

In general, when a power transmission belt is splashed with water, the water intrudes into a space between the belt and a pulley, and the belt slips so that an unpleasant noise can be caused or a load cannot be sufficiently transmitted. For example, in a power transmission belt used as a fan belt for an automobile, the belt is splashed with water when the automobile runs through a puddle, resulting in causing the aforementioned phenomena.

Therefore, in order to remove water splashed on a belt, a conventional belt is provided with a concave cog latitudinally extending on the surface of the belt in contact with a pulley, or provided with a drain hole penetrating from the contact surface (the inner face) to the back face.

On the other hand, as is disclosed in, for example, Japanese Laid-Open Patent Publication No. 59-65644, it is known that the wear resistance of a belt can be improved by mixing short fibers such as carbon fibers in the contact surface with a pulley.

However, when a belt has the contact surface with a pulley including short fibers as described above, the short fibers can be exposed on the surface of the belt. In such a case, when the belt is splashed with water, the water can easily remain between the exposed fibers, and hence, the water is more difficult to remove than in a belt not including the short fibers. In particular, when the contact surface with a pulley is processed with a grindstone, the short fibers are more largely exposed, so that a water removing property can be further degraded, and the belt slips for a long period of time with a large noise. Moreover, when the belt is new, the short fibers are more largely exposed, and hence, the new belt has a poorer water removing property than a belt used for a long period of time.

Therefore, such a belt including the exposed short fibers can be provided with a cog or a drain hole as in the aforementioned conventional belt. However, this countermeasure requires a larger number of processing procedures, resulting in increasing a manufacturing cost. In addition, in providing a cog, a large number of cogs are necessary to be formed with a small pitch therebetween for attaining a sufficient water removing effect. Therefore, the belt can be degraded in its durability and a whistling noise can be caused. On the other hand, in providing a drain hole, the drain hole cuts a cord buried for enforcing the belt, so that the strength of the belt can be decreased.

Also in a power transmission roller including short fibers in a surface in contact with an opposite member, the water removing property is poor as in the power transmission belt. When the roller is splashed with water, the roller can slip so that an unpleasant noise can be caused and that a load cannot be sufficiently transmitted.

The object of the invention is improving means for removing water from a power transmission belt or roller including short fibers in a surface in contact with an opposite member, while suppressing the performance of the belt or roller from being degraded and the manufacturing cost from increasing. In addition, the water removing property against water splashed on the belt or roller is improved so that the belt or roller can be prevented from slipping and causing an unpleasant noise.

SUMMARY OF THE INVENTION

In order to achieve the aforementioned object, according to the invention, a surface of a power transmission belt or roller in contact with an opposite member is provided with water repellency.

Specifically, in the power transmission belt of this invention including short fibers in a contact surface with a pulley, the contact surface with a pulley has water repellency.

Thus, with the water repellency of the contact surface with the pulley and the surfaces of the exposed short fibers, water is difficult to remain between the short fibers and is attached, in the shape of small drops, on the contact surface with the pulley or the surfaces of the short fibers. Accordingly, the water drops can be easily shaken off due to vibration and the like caused during the usage of the belt, resulting in improving the water removing property of the belt. As a result, there is no need to provide the belt with a cog or a drain hole for improving its water removing property, but the contact surface with the pulley can be simply subjected to a water repelling treatment. Thus, while suppressing the performance degradation and increase in manufacturing cost of the belt, slip and an unpleasant noise can be suppressed from being caused when the belt is splashed with water.

In the power transmission belt, the contact surface with a pulley which is processed with a grindstone and from which short fibers are exposed displays a remarkable effect. Namely, the short fibers are largely exposed in the belt whose contact surface with a pulley is ground with a diamond grindstone or a general grindstone. When no means is provided to such a belt, its water removing property can be degraded. However, when such a belt is provided with the water repellency, the water removing property of the belt can be remarkably improved substantially regardless of the extent of the exposure of the short fibers. Accordingly, the effect of the invention can be more remarkably exhibited.

Furthermore, in the power transmission belt, the contact surface with a pulley can be coated with a water repellent agent. Thus, the water repellency can be easily attained by coating the contact surface with a pulley by spraying a water repellent agent or the like (e.g., Scotch Guard by 3M Corporation in the U.S.). In addition, even when the short fibers are largely exposed, the water repellent agent is uniformly coated also on the surfaces of the exposed short fibers. Therefore, while suppressing the manufacturing cost, the water removing property can be further improved.

Moreover, in the power transmission roller of this invention including short fibers in a contact surface with an opposite member, the contact surface with an opposite member can be provided with water repellency. Thus, also in the same manner in the power transmission roller as in the power transmission belt, the performance degradation and the increase in manufacturing cost of the roller can be suppressed as well as slip and an unpleasant noise can be prevented from being caused when the roller is splashed with water.

DETAILED DESCRIPTION OF THE INVENTION

Figure 1:
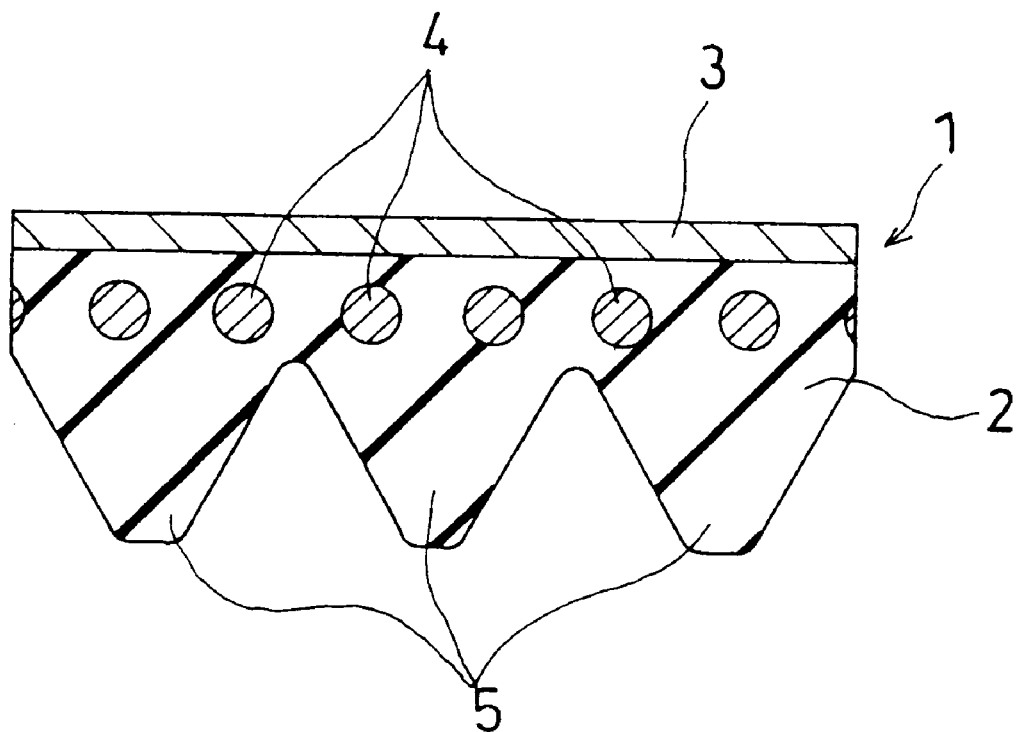
FIG. 1 is a sectional view of a V-ribbed belt exemplified as a power transmission belt according to an embodiment of the invention.

Now, a preferred embodiment of the invention will be described with reference to the accompanying drawing. FIG.

1 shows a V-ribbed belt 1, that is, a power transmission belt according to the embodiment of the invention. The V-ribbed belt 1 includes a belt body 2 and a belt fabric 3 adhered to a back face (i.e., an upper surface in FIG. 1) of the belt body 2. The belt body 2 is made from a rubber component, and includes a plurality of polyester fiber cords 4 as enforcing cords extending along the longitudinal direction of the belt with a substantially equal distance therebetween in the latitudinal direction. Also, on an inner face (i.e., a lower surface in FIG. 1) of the belt body 2, three V-shaped ribs 5 are formed so as to extend in the longitudinal direction with a substantially equal distance therebetween in the latitudinal direction.

The surfaces of the respective ribs 5 work as a contact surface with a pulley, and the surfaces of the ribs 5 include short fibers such as carbon fibers. Also, the surfaces of the ribs 5 are processed with a diamond grindstone or a general grindstone, and then are uniformly coated with a water repellent agent (e.g., Scotch Guard by 3M Corporation in the U.S.). As a result, the surfaces of the ribs 5 attain water repellency.

The fabric 3 is made from a fabric material such as cotton, nylon and polyester. The fabric 3 is processed with a rubber cement, and then is adhered to the back face of the belt body 2 through vulcanized splice.

Thus, in the V-ribbed belt 1 of this embodiment, since the surfaces of the ribs 5, that is, the contact surface with a pulley, are coated with the water repellent agent, the surfaces of the ribs 5 can easily attain the water repellency. Furthermore, although the short fibers are included in the surfaces of the ribs 5, even when the short fibers are exposed on the surface of the belt 1, water splashed on the belt 1 does not remain between the short fibers but is adhered, in the shape of drops, to the surfaces of the ribs 5 and the surfaces of the short fibers. Therefore, the water drops can be easily shaken off owing to vibration and the like caused during the usage of the belt 1. Thus, the belt 1 can attain a good water removing property. As a result, there is no need to provide the belt 1 with a cog or a drain hole for improving its water removing property. Accordingly, while suppressing the performance degradation and the increase in manufacturing cost of the belt 1, the slip of the belt 1 and the accompanied unpleasant noise can be avoided.

Moreover, since the surfaces of the ribs 5 are processed with the grindstone, the short fibers are largely exposed, and hence, the water removing property can be very poor without providing any means to the belt. However, the water repellent agent is coated on the surfaces of the ribs 5 in this embodiment, and hence, the water removing property can be improved substantially regardless of the extent of the exposure of the short fibers. Thus, the improvement in the water removing property can be more effectively exhibited.

In this embodiment, the water repellent agent is coated on the surfaces of the ribs 5 of the V-ribbed belt 1. However, the invention is applicable to another type of power transmission belt such as a V belt and a timing belt including short fibers in a contact surface with a pulley.

Furthermore, on the basis of the same concept as in the aforementioned power transmission belt, the invention is applicable to a power transmission roller including short fibers in a contact surface with an opposite member. By providing the contact surface with an opposite member with water repellency, the performance degradation and the increase in manufacturing cost of the roller can be suppressed as well as the slip and the accompanied unpleasant noise can be prevented from being caused when the roller is splashed with water.

Next, a concretely practiced embodiment will be described. First, a general V-ribbed belt, whose ribs 5 include short fibers such as carbon fibers in their surfaces and are processed with a general grindstone on their surfaces, is coated with a water repellent agent on the surfaces of the ribs 5. Thus, a V-ribbed belt 1 is fabricated. As the water repellent agent, a commercially available water proofing spray for sports clothing is used.

Then, the V-ribbed belt 1 is subjected to a test for its water removing property. Specifically, the V-ribbed belt 1 is wound around driving and driven pulleys each with a diameter of 100 mm with tension of 30 kgf (294 N), and the driving pulley is driven with a load of the driven pulley of 6 kW, so as to attain a rotating speed of 2000 rpm ($33.3\ s^{-1}$). At this point, 500 cc ($5 \times 10^{-4}\ m^3$) of water is dropped for 10 seconds on the contact surface with the pulleys of the V-ribbed belt 1 between the driving and driven pulleys, and loudness of a noise, duration of the noise and duration of slip of the belt 1 are respectively measured. This test is carried out immediately after starting the drive of the belt 1 and after driving the belt 1 for a predetermined period of time. As a comparison example, the original general V-ribbed belt that is not coated with the water repellent agent is measured with regard to the same items.

The results of the test are listed in Table 1. As is shown in Table 1, in the measurement after driving the belt for a predetermined period of time, the results obtained by the belt of the embodiment are substantially the same as those obtained by the comparison example all in the loudness of the noise, the duration of the noise and the duration of the slip. However, in the measurement immediately after starting the drive of the belt, the results of the belt of this embodiment are more satisfactory than those of the comparison example. This is because the short fibers are more largely exposed immediately after starting the drive of the belt, whereas the exposed portions of the short fibers are removed through the drive for a predetermined period of time. This reveals that the water removing property can be remarkably improved by this invention when the short fibers are largely exposed.

Furthermore, in the test carried out immediately after starting the drive, the results of the belt of the embodiment are substantially the same as those obtained after driving the belt for a predetermined period of time. Therefore, even when the short fibers are largely exposed, the water removing property of the belt can be improved to an extent substantially the same as in a belt where short fibers are not exposed.

TABLE 1

|  |  | Present Embodiment | Comparison Example |
| --- | --- | --- | --- |
| Immediate after starting drive | Noise loudness | Small | Large |
|  | Noise duration | Moment | 10 sec. |
|  | Slip duration | 20 sec. | 60 sec. |
| After drive of predetermined time | Noise loudness | Small | ← |
|  | Noise duration | Moment | ← |
|  | Slip duration | 20 sec. | ← |

What is claimed is:

1. A power transmission belt including short fibers which are exposed to a contact surface of the belt with a pulley, wherein said exposed short fibers and all of said contact surface of the belt are coated with a water repellant agent.

* * * * *